United States Patent Office 3,843,454
Patented Oct. 22, 1974

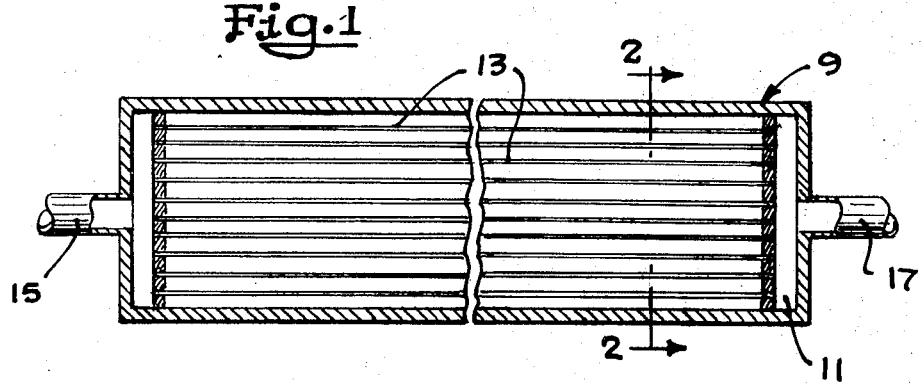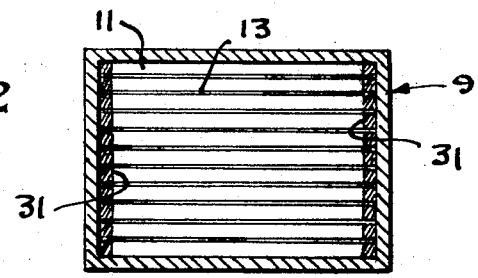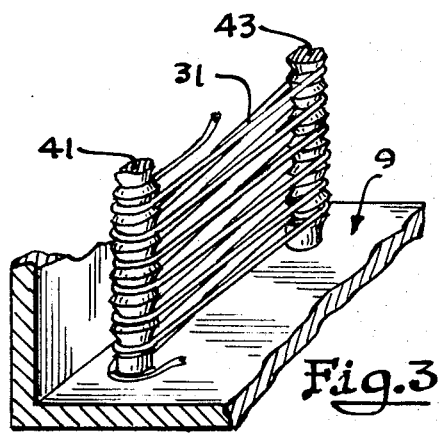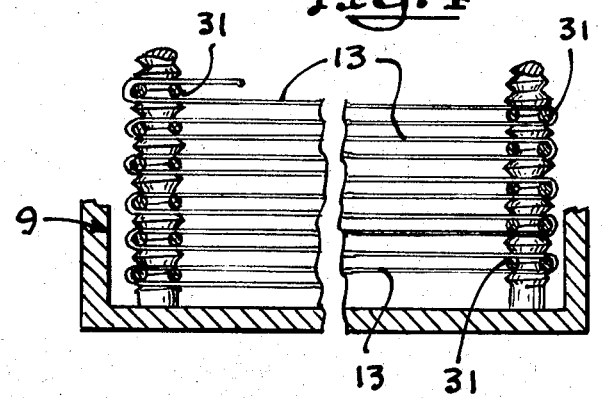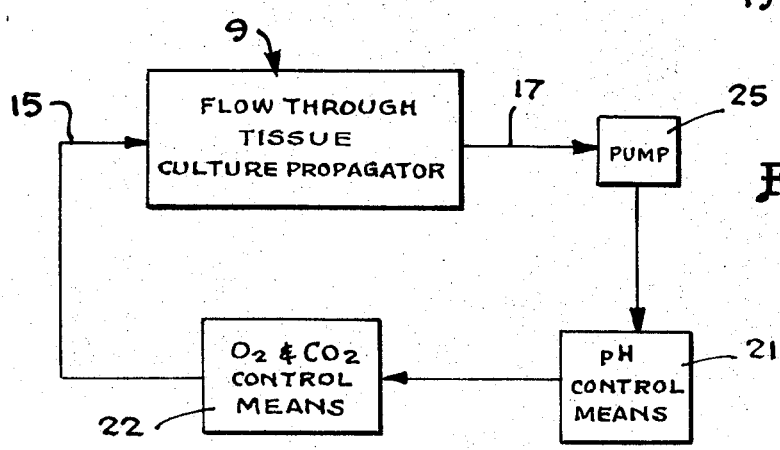

3,843,454
FLOW THROUGH TISSUE CULTURE
PROPAGATOR
Ronald Eugene Weiss, Grayslake, Ill., assignor to Abbott
Laboratories, North Chicago, Ill.
Filed July 31, 1972, Ser. No. 276,616
Int. Cl. C12b 1/04
U.S. Cl. 195—127                                11 Claims

ABSTRACT OF THE DISCLOSURE

An improved apparatus for propagating tissue culture cells, preferably, comprising a vessel enclosing a rectangular reservoir having stacked therein at equal intervals along the entire height of the reservoir, a plurality of rectangular plates, each substantially coextensive with the horizontal dimensions of the reservoir and spaced from the opposite vertical walls of the reservoir at each end of one horizontal dimension thereof to allow a liquid culture medium to pass as it flows through the reservoir. Circulation inlet and outlet means are disposed in the opposite vertical walls of the reservoir from which the plates are spaced and identical flow of the medium over each plate of the propagator is obtained, in the preferred embodiment.

BACKGROUND OF THE INVENTION

This invention relates to an improved apparatus for growing living cells, and in particular, to apparatus for growing tissue cultures on a large scale.

Large scale tissue culture propagation is desirable in view of the large quantities of living cells required in the development and production of biochemicals and vaccines and the large quantities of biochemicals, cells and viruses required for research studies. However, most prior art techniques and equipment for growing tissue cultures on surfaces are not adapted for large scale production, particularly in a single production unit.

One common tissue culture process for virus production of vaccines entails cell growth on the bottom surface of one-liter rectangular bottles. Sterilized tissue culture medium containing a suspension of cells is added to the bottles. The cells are then incubated until the cell growth forms a confluent sheet on the submerged glass surface, after which the cell growth medium is replaced with a fresh medium containing the desired virus. After the virus penetrates the cells and virus concentration in the medium has obtained a satisfactory level via the reproductive process, the medium containing the virus is processed to make vaccines. This method requires cell growth on the surface of a large number of bottles in order to obtain significant amounts of tissue cultures.

German Patent 1,215,303 granted to Wiegand, et al., April 28, 1966, discloses an apparatus for the large scale propagation of cells in tissue culture that is essentially a stack of special bottles which can be automatically filled and emptied.

U.S. Pat. 3,407,120 granted to Weiss, et al., Oct. 22, 1968, discloses apparatus for the large scale propagation of cells in tissue culture and the teachings thereof are incorporated herein by reference thereto. That apparatus, briefly stated, comprises a plurality of spaced-apart plates or discs made of glass, plastic, or other suitable material upon which cells may attach and proliferate. The plates are contained within a vessel or tank-type container. Means for mixing and oxygenation of a liquid culture medium are provided, as well as the attendant measuring and recording devices for control of proper growth conditions. The method of tissue culture cell growth employing such apparatus provides a closed, self-contained unit in which cell growth may be conducted in a substantially uniform, controlled environment. A large surface area on which cell growth can occur is provided in a relatively small total volume in comparison to the large total volume required to provide an equivalent cell growth surface area in a multitude of glass bottles or flasks.

Additionally, the tissue culture propagator of Weiss, et al., permits the utilization of an adjustable ratio of medium per cell sheet area; provides a self-contained unit which can be sterilized in place; provides means for separating the tissue culture cells from the fluid simply and easily; permits intermittent or continuous sampling of contents for analysis and control purposes; provides for in-place cleaning and reuse of the spaced plates; provides means for maintaining control of a uniform environment; minimizes the amount of labor per cell sheet area as compared to the handling of a multitude of glass bottles or flasks; and provides an automated system in comparison to methods and apparatus known prior thereto.

Although the Weiss, et al., propagator is very successful in growing cells, it has been found that the flow characteristics of the Weiss, et al., propagator are not uniform. Therefore, each growth plate does not have an identical volume of liquid culture medium passing over it per unit of time. Because the circulating medium provides the means of maintaining pH control and providing the oxygen requisite for metabolism and respiration of the growing cells, as well as the removal of carbon dioxide produced by the metabolism of the cells, some minimum volume of medium must flow over each plate per unit of time if desirable cell growth, viral production, or the like, is to be maintained. In order to provide that minimum volume of media flow in the Weiss, et al., propagator, it has been found necessary to maintain the interval between the stacked plates at some minimum dimension that is related directly to the volume of a particular propagator, the liquid culture medium employed and the cell growth or other production involved.

Because of that limitation on the spacing of the growth plates, a relatively large volume of medium per cell surface is required in the Weiss, et al., propagator compared to that required in the prior art roller bottle systems. That is a material disadvantage in view of the high cost of liquid culture medium. Further, the lack of uniform flow characteristics in the Weiss, et al., propagator results in inefficient washing or removing of the cells grown.

SUMMARY OF THE INVENTION

Therefore, the primary object of the present invention is to provide a tissue culture propagator that will satisfy the aforementioned requirements and preferences.

More particularly, it is an object of the present invention to provide an economical and efficient flow through tissue culture propagator that provides a means for passing a substantially equal volume of liquid culture medium of substantially the same composition over each growth plate or surface thereof per unit of time.

In accordance with these and other objects, there is provided by the present invention, an improved apparatus for propagating tissue culture cells which provides substantially identical flow of a liquid culture medium across each growth surface therein and comprises a vessel enclosing a reservoir having inlet and outlet means to and from a circulating system for the medium disposed substantially at opposite vertical walls of the reservoir. Preferably, the vessel encloses a substantially rectangular reservoir having stacked therein at substantially equal intervals along its entire height, a plurality of substantially rectangular plates, each substantially coextensive with the horizontal dimensions of the reservoir and spaced from the opposite vertical walls of the reservoir at each end of a first horizontal dimension thereof to allow the liquid culture medium to pass as it circulates through the reservoir.

BRIEF DESCRIPTION OF THE DRAWINGS

Other objects and attendant advantages will become obvious to those skilled in the art by reading the following detailed description in connection with the accompanying drawings, wherein like reference characters designate like or corresponding parts throughout the several figures thereof and wherein:

FIG. 1 is a side view in cross-section of an apparatus embodying the present invention;

FIG. 2 is an end view in cross-section of the apparatus shown in FIG. 1;

FIG. 3 is partial isometric view of one embodiment of a rack useful in one embodiment of the present invention;

FIG. 4 is a partial side view cross-section of the rack shown in FIG. 3; and

FIG. 5 is a schematic representation of one system for propagating tissue culture cells contemplated by the present invention.

DETAILED DESCRIPTION OF THE INVENTION

Referring now to the drawings, there is shown in FIGS. 1 and 2 a preferred embodiment illustrative of the apparatus of the present invention. In FIG. 1, there is shown a vessel 9 enclosing a substantially rectangular reservoir 11. A plurality of substantially rectangular plates 13 are stacked and spaced apart at substantially equal intervals along the entire height of the reservoir 11. Each plate 13 is substantially coextensive with both horizontal dimensions of the reservoir 11, as can be seen in FIGS. 1 and 2.

Each plate 13 is spaced from the opposite vertical walls of reservoir 11 at each end of a first horizontal dimension thereof to provide spaces or vertical channels through which a liquid culture medium can pass as it circulates through the reservoir 11. To enable each plate 13 to provide the maximum growth surface possible, the space between each plate 13 and the vertical walls of reservoir 11 at each end of said first horizontal dimension, preferably, does not exceed that dimension required to create a less substantial pressure drop along the vertical spaces or channels between vessel 9 and plates 13 than the pressure drop between each successive plate. Accordingly, the preferred spacing between plates 13 and the vertical walls of reservoir 11 formed by vessel 9 will vary with the spacing or interval between plates 13. Preferably, as can be seen in FIG. 2, the plurality of plates 13 are closed and exactly coextensive with the second horizontal dimension of the reservoir 11. That is the plurality of plates 13 are each substantially closed along and between the plurality of vertical walls of vessel 9, transverse to the opposite vertical walls at each end of said first horizontal dimension.

Conduits 15 and 17 made of some suitable material, e.g., silicone rubber or stainless steel, provide outlet and inlet means to reservoir 11 for a means of circulating the liquid culture medium through reservoir 11. Although conduits 15 and 17 are shown disposed at the center of opposite vertical walls of reservoir 11 formed by vessel 9 in FIG. 1, they can be disposed at any desired location on vessel 9 that will cause the liquid culture medium to enter and leave reservoir 11 substantially adjacent opposite vertical walls thereof. Accordingly, conduits 15 and 17 can be located in any wall of reservoir 11, as long as they are respectively disposed at opposite vertical walls of reservoir 11.

As illustrated in FIG. 5, it is contemplated that the flow through tissue culture propagator illustrated and embodied in vessel 9 will be used in conjunction with means 21 for controlling the pH of the liquid culture medium within a predetermined range as it circulates through the reservoir 11, means 23 for introducing oxygen and controlling $CO_2$ concentration in the liquid culture medium, and means for circulating the liquid culture medium through the reservoir 11, including a pump 25; as described by Weiss, et al. FIG. 3 of Weiss, et al., and the detailed description relating thereto at column 3, lines 41 et seq., more fully illustrate and describe one contemplated system into which vessel 9 can be readily incorporated.

Vessel 9 and plates 13 can be made from any nontoxic material, or combination of materials, capable of growing cells and having adequate strength to resist the fluid pressures placed on them during sterilization of the apparatus or the washing or removing of the cells therefrom. High-temperature materials can be used if the method of sterilization so dictates. Preferably, the material can be transparent so that the growth of cells on the plates can be microscopically observed. Several glasses and plastics fit these requisites and polycarbonate plastics have been found to be especially useful.

Further, it has been found that the plates 13 can advantageously be formed by a continuous strip of material undulated about a holding means for that purpose which is disposed within reservoir 11. The continuous strip of material should have the above-stated characteristics for plates 13 and must be flexible enough to be readily folded without damage thereto. Alternatively, the continuous strip of material can be an undulated or convoluted material having sufficient rigidity to be self-supporting. Many racks comprising frameworks of bars, rods, pegs, threads, wires, lines, cords or plates arranged to provide a plurality of horizontal, parallel supports disposed at substantially right angles to the opposite vertical walls at which the inlet 17 and outlet means 15 are disposed can be used for holding the continuous strip of material in the form of stacked, spaced-apart plates.

FIGS. 3 and 4 illustrate the embodiment of one rack suitable for mounting or holding a continuous strip of material in the form of plates 13. Rods 41 and 43, which can be made of stainless steel, are attached to the bottom wall of reservoir 11. Preferably, rods 41 and 43 are also disposed substantially in juxtaposition with a vertical wall of reservoir 11 which is adjacent and transverse to the vertical walls of reservoir 11 at which inlet 17 and outlet 15 are disposed. Rods 41 and 43 have a continuous helical screw thread along their entire outer surface. Alternatively, horizontal grooves can be used instead of the screw thread. A continuous string 31 wound very tautly alternately around rods 41 and 43 provides a plurality of horizontal, parallel and equally spaced supports disposed at substantially right angles to the vertical walls at which inlet 17 and outlet 15 are disposed.

Rods comparable to 41 and 43 are also attached to the bottom wall of reservoir 11 at the opposite end therof, and another string wound around them. Then, as illustrated in FIG. 4, a continuous strip of material can be undulated about the support strings 31 to form plates 13.

Vessels 9 and plates 13 that have been constructed by the technique of hot air welding from polycarbonate plastic manufactured by General Electric Company, under the name Lexan, have withstood autoclaving and are of adequate strength to withstand the pressures created by the circulation of the fluids throughout the propagator system. Lexan polycarbonate plates are available in sheets up to eight feet long and four feet wide, thereby making it possible to construct very large vessels 9 and plates 13 from one piece of the polycarbonate plastic, if so desired. However, the construction of vessel 9 and plates 13 is not limited to components of one piece design, since it is possible to construct them out of multiple pieces butted or otherwise joined together. Accordingly, there appears to be no limit to the size of vessel 9 and plates 13 that can be constructed.

Further, vessel 9 can be permanently bonded together once the plates 13 are placed in reservoir 11, or if preferred, vessel 9 can be assembled in a manner such that it can readily be disassembled or opened when desired.

Likewise, plates 13 can be permanently or removably mounted in vessel 9.

In the preferred embodiment of the present invention shown in FIG. 1 and 2, because the plates 13 are equally spaced apart, the flow of liquid culture medium over each plate is substantially the same throughout reservoir 11 when it is completely filled by a medium. Uniform flow through the reservoir 11 can readily be proven by hydrostatic principles and uniform flow across all the plates 13 can be empirically demonstrated by dye injection experiments.

Accordingly, since a uniform flow is obtained throughout reservoir 11, the amount of liquid medium flowing over each plate 13 per unit of time can be very accurately determined. Likewise measurement of the dissolved oxygen content of the medium as it enters and exits from vessel 9 enables the respiration of the tissue culture cells to be measured. Thus, by controlling the rate of flow of the medium through the reservoir 11, a predetermined minimum amount of medium can be passed over each plate 13 per unit of time for any intervals by which the plates are equally spaced apart. It has been found that when the propagator of the present invention is used in a tissue culture propagator system such as that shown in FIG. 3, very satisfactory cell growth can be obtained when plates 13 are spaced apart by intervals as small as $\frac{1}{16}$ of an inch and even smaller intervals appear to be attainable.

The space or interval between plates 13 is directly proportional to the amount of liquid culture medium required to submerge or inundate every plate of the tissue culture propagator. Accordingly, any reduction in the distance between the plates 13 enables the same surface area to be inundated by a proportionately reduced amount of liquid culture medium. Likewise, where other conditions are equal, it has been found that a propagator of the present invention can be properly operated with $\frac{1}{5}$ to $\frac{1}{10}$ the amount of medium required by a Weiss, et al., propagator providing the same growth plate surface area.

In the embodiment of the present invention shown in FIGS. 1 and 2, the plates 13 are stacked one plate on another by spacers 31 of substantially equal thickness. Preferably, spacers 31 can be made of a silicone rubber. Additionally, other means of supporting and separating the plates 13 may be employed; for example, each plate 13 can have a ridge or spacer formed integrally with its bottom surface that rests on the top surface of the plate immediately below it.

The process of growing tissue can be carried out with the above-described apparatus as follows. First, the apparatus is cleaned, assembled and sterilized. Liquid nutrient medium and the desired cells for planting are then prepared. A quantity of nutrient liquid, sufficient to cover the plurality of plates and comprising suitable nutrients, salt solutions, buffers, sera, pH indicators and antibiotics, is prepared. For most cells it is desirable to maintain the pH between 6.6 and 7.6. The cells for planting are obtained by a process of cell separation whereby individual cells are released from minced pieces of tissue. This may be done by the action of Trypsin or another suitable enzyme, or by any other suitable system which can be mechanical or chemical. The individual cells are washed in nutrient medium to remove or neutralize proteolytic enzymes. The cells are then resuspended in the midium to the desired concentration for planting.

The suspension is added to the mass tissue culture propagator aseptically by pump, vacuum or gravity feed. The cells are then allowed to settle for a period of time sufficient to permit attachment to the surfaces of the plates. If so desired, by inverting vessel 9 after a portion of the cells have attached to the top of the plates 13, cells can also attach to the bottom of the plates 13, thereby doubling the available growth plate surface area enclosed within vessel 9.

The media circulation equipment is then energized. With some cells, circulation of the medium can be started immediately. Uniformity of pH, dissolved oxygen and $CO_2$ within vessel 9 is obtained by controlling the rate of liquid circulation.

The temperature of the circulating liquid medium can be controlled by use of a jacketed vessel and an external heat transfer means, or by placing vessel 9 in a constant temperature water bath or a constant temperature room. The growth of the cells on the plates is followed and monitored by the uptake of chemicals from the nutrient medium as well as by microscopic observations of suitable control vessels and/or one or more observation plates within the system. Because reservoir 11 is normally completely filled with liquid during its use, optical observation of cell growth on the plates 13 is facilitated as opposed to the propagator of Weiss, et al., wherein a layer of gas is disposed between the vessel and the liquid medium.

After a suitable predetermined time, a confluent monolayer of cells is attained on the surface of the plates. At this time the nutrient fluids are removed by pressure, vacuum or gravity, and the tissue can be washed to remove traces of nutrient media or serum, and refilled with new medium, all under aseptic conditions. Then, the cells can be studied or used for vaccine production, biochemical production, nutritional observations, or the like.

While the present invention has been described and illustrated in its preferred embodiment, it will be readily apparent to those skilled in the art that other embodiments of the present invention can be effected, although the efficiency of those other embodiments might be less than that of the preferred embodiment. Therefore, while the preferred embodiment of the present invention comprises a rectangular reservoir 11, reservoirs having other geometric configurations can also be used. Likewise, while the plates 13 of the preferred embodiment are stacked and spaced-apart at substantially equal intervals along the entire height of reservoir 11, less efficient embodiments of the present invention can be effected wherein the plates are not substantially equally spaced or do not span the entire height of the reservoir. Finally, while the plates 13 of the preferred embodiment are rectangular, as is the reservoir 11, embodiments of the present invention can be effected wherein the plates are not exactly the same geometric shape as that of the reservoir.

The present invention is further illustrated by the following examples. (The MEM, BME, Medium 199 and Earl's salts solutions referred to in Examples 1 and 2 are well known in the art of tissue culture propagation and are set forth in detail in a report in the publication *In Vitro*; entitled "A Survey of Commercially Available Tissue Culture Media"; edited by H. C. Morton; Vol. 6, No. 2; pages 89–108; 1970.)

Example I

Ten day old chicken embryos were removed, decapitated and placed into the barrel of a 20 ml. syringe and extruded through the syringe three times. That embryo suspension was then washed three times with phosphate, buffered saline solution and then trypsinized three times for ten minutes at room temperature. Any debris was strained from the cell suspension which was then centrifuged at 1500 r.p.m.'s for 10 minutes. The supernatent therefrom was then decanted and the cells resuspended in a standard Minimal Essential Medium solution (MEM) containing Earl's salts and 6% fetal calf serum at 100,000 cells/ml. 2.5 Liters of the cell suspension were then pumped into an autoclaved propagator of the present invention, constructed of hot air welded Lexan polycarbonate plastic, and incubated for 24 hours without circulation to allow for cell attachment. The propagator is 3 inches wide, 8 inches high and 9½ inches long and filled with 35 plates, 3 inches by 8 inches, of Pennvernon single strength B window glass stacked and spaced apart ⅛ of an inch on silicone rubber spacers. A 5% $CO_2$-air mixture was passed through a surge tank aerator at a rate of 50 ml./minute. After 24 hours the media was circulated at 100 ml./min. by a pump. After 8 days of growing time, the plates were removed from the propagator and a confluent monolayer of cells equivalent to those grown in prior art tissue culture bottles was observed to have grown on each plate.

Example II

A human embryo kidney cell suspension was prepared by trypsinization of human embryo kidneys and frozen in a dimethylsulfoxide and standard Basal Medium Eagle's solution (BME) with 20% fetal calf serum and stored in liquid nitrogen. That suspension was then suspended in a 1 liter Medium 199 solution containing 5% fetal bovine serum at 18,000 cells/ml. 1.1 Liters of cell suspension were pumped into a propagator of the present invention, constructed of welded Lexan polycarbonate plastic sheets on its sides and stainless steel end plates, and incubated for 48 hours without circulation to allow for cell attachment to the growth plates. The propagator was sterilized by autoclaving and formed a rectangular reservoir 1½ inches wide, 3½ inches high and 24 inches long containing 1½ inch by 23 inch Lexan polycarbonate plates spaced 1/16 inch apart by silicone rubber discs. A 5% $CO_2$-air mixture was passed through a surge tank aerator at a rate of 50 ml./min. After 48 hours the media was circulated at 50 ml./min. through the reservoir by a pump. Cell growth on the plates was monitored by a microscopic examination of the plates through the transparent top of the propagator and by glucose analysis of medium samples taken periodically. After 8 days of growing time, a confluent monolayer of cells was obtained on each plate.

Having now described the invention in specific detail and exemplified the manner in which it may be carried into practice, it will be readily apparent to those skilled in the art, that innumerable variations, applications, modifications and extensions of the basic principles involved, may be made without departing from its sphere or scope.

What is claimed is:

1. An apparatus for propagating tissue culture cells comprising a vessel adapted for holding liquid culture medium, said vessel having a pair of opposite vertical walls at opposite ends of a first horizontal dimension thereof and a plurality of vertical walls transverse to said opposite vertical walls, said vessel having disposed therein a plurality of stacked, spaced-apart plates formed by a continuous strip of undulated material and adapted to provide surfaces to which cell growth can attach,
   said plates each spaced from said pair of opposite vertical walls of said vessel to thereby form first and second vertical channels within said vessel at said opposite ends of said first horizontal dimension thereof,
   an inlet conduit into said vessel opening directly into said first vertical channel; and
   an outlet conduit from said vessel exiting directly from said second vertical channel.

2. The apparatus defined in Claim 1, wherein said material is undulated about a holding means therefor disposed within said vessel.

3. The apparatus defined in Claim 2, wherein said holding means comprises a rack having a plurality of horizontal, parallel supports disposed transversely to said opposite vertical walls.

4. The apparatus defined in Claim 3, wherein said supports are substantially in juxtaposition with the plurality of vertical walls of said vessel transverse to said opposite vertical walls.

5. The apparatus defined in Claim 3, wherein said vertical dimension of said supports is equal to the vertical distance between said plates.

6. The apparatus defined in Claim 3, wherein said supports are formed by a continuous string wound about at least two vertical rods having grooves on their outer surfaces.

7. The apparatus defined in Claim 6, wherein said grooves are a helical screw thread.

8. The apparatus defined in Claim 1, wherein said undulated material is self-supporting.

9. An apparatus for propagating tissue culture cells comprising a vessel adapted for holding liquid culture medium, said vessel having a pair of opposite vertical walls at opposite ends of a first horizontal dimension thereof and a plurality of vertical walls transverse to said opposite vertical walls, said vessel having disposed therein a plurality of stacked, spaced-apart plates made of polycarbonate and adapted to provide surfaces to which cell growth can attach, said plates each spaced from said pair of opposite vertical walls of said vessel to thereby form first and second vertical channels within said vessel at said opposite ends of said first horizontal dimension thereof, an inlet conduit into said vessel opening directly into said first vertical channel; and an outlet conduit from said vessel exiting directly from said second vertical channel.

10. An apparatus for propagating tissue culture cells comprising a vessel made of polycarbonate and adapted for holding liquid culture medium, said vessel having a pair of opposite vertical walls at opposite ends of a first horizontal dimension thereof and a plurality of vertical walls transverse to said opposite vertical walls, said vessel having disposed therein a plurality of stacked, spaced-apart plates adapted to provide surfaces to which cell growth can attach, said plates each spaced from said pair of opposite vertical walls of said vessel to thereby form first and second vertical channels within said vessel at said opposite ends of said first horizontal dimension thereof, an inlet conduit into said vessel opening directly into said first vertical channel; and an outlet conduit from said vessel exiting directly from said second vertical channel.

11. An apparatus for propagating tissue culture cells comprising a vessel adapted for holding liquid culture medium, said vessel having a pair of opposite vertical walls at opposite ends of a first horizontal dimension thereof and a plurality of vertical walls transverse to said opposite vertical walls, said vessel having disposed therein a plurality of stacked, spaced-apart, substantially horizontal plates adapted to provide surfaces to which cell growth can attach,
   said plates each spaced from said pair of opposite vertical walls of said vessel to thereby form first and second vertical channels within said vessel at said opposite ends of said first horizontal dimension thereof,
   said plates each substantially closed along and between said plurality of vertical walls transverse to said opposite vertical walls,
   an inlet conduit into said vessel opening directly into said first vertical channel; and
   an outlet conduit from said vessel exiting directly from said second vertical channel.

References Cited

UNITED STATES PATENTS 3,563,389   2/1971   Mizrahi et al. ........ 210—521

A. LOUIS MONACELL, Primary Examiner

R. B. PENLAND, Assistant Examiner

U.S. Cl. X.R.

195—1.7, 139, 142